US008458468B2

(12) United States Patent
Leone et al.

(10) Patent No.: US 8,458,468 B2
(45) Date of Patent: *Jun. 4, 2013

(54) METHOD AND SYSTEM FOR PROTECTING INFORMATION EXCHANGED DURING COMMUNICATION BETWEEN USERS

(75) Inventors: Manuel Leone, Turin (IT); Ettore Elio Caprella, Turin (IT)

(73) Assignee: Telecom Italia S.p.A., Milan (IT)

( * ) Notice: Subject to any disclaimer, the term of this patent is extended or adjusted under 35 U.S.C. 154(b) by 1112 days.

This patent is subject to a terminal disclaimer.

(21) Appl. No.: 11/630,436

(22) PCT Filed: Jun. 25, 2004

(86) PCT No.: PCT/EP2004/006936
§ 371 (c)(1),
(2), (4) Date: Dec. 22, 2006

(87) PCT Pub. No.: WO2006/002649
PCT Pub. Date: Jan. 12, 2006

(65) Prior Publication Data
US 2007/0234034 A1    Oct. 4, 2007

(51) Int. Cl.
*G06F 21/00* (2006.01)

(52) U.S. Cl.
USPC .......................................................... 713/168

(58) Field of Classification Search
USPC ................. 713/150, 161, 168–169; 726/2, 4
See application file for complete search history.

(56) References Cited

U.S. PATENT DOCUMENTS

| 6,081,601 | A | 6/2000 | Raivisto | |
|---|---|---|---|---|
| 6,510,515 | B1 | 1/2003 | Raith | |
| 6,823,354 | B1 * | 11/2004 | Kynast et al. | 709/200 |
| 2002/0007453 | A1 | 1/2002 | Nemovicher | |
| 2002/0150253 | A1 * | 10/2002 | Brezak et al. | 380/281 |
| 2003/0026432 | A1 * | 2/2003 | Woodward | 380/278 |
| 2003/0119482 | A1 * | 6/2003 | Girard | 455/411 |
| 2005/0114680 | A1 * | 5/2005 | Chinnaswamy et al. | 713/185 |

FOREIGN PATENT DOCUMENTS

| WO | WO 99/16277 | 4/1999 |
|---|---|---|
| WO | WO 02/093967 A1 | 11/2002 |

OTHER PUBLICATIONS

Dierks, T. et al., "The TLS Protocol Version 1.0," Network Working Group Request for Comments: 2246, Category: Standard Track, pp. 1-80, (Jan. 1999).
Fraser, B. et al., "IP Security Protocol (ipsec)," http://www.ietf.org/html.charters/OLD/ipsec-charter.html, pp. 1-5, (Jun. 7, 2004).

(Continued)

*Primary Examiner* — Brandon Hoffman
*Assistant Examiner* — Anthony Brown
(74) *Attorney, Agent, or Firm* — Finnegan, Henderson, Farabow, Garrett & Dunner, L.L.P.

(57) ABSTRACT

A system includes a sending terminal and at least one receiving terminal, the terminals capable of being connected to a communication network for transmitting an information item from the sending terminal to the at least one receiving terminal. The sending terminal is linked via a secure channel to a unit adapted to encrypt sensitive data using a first encryption/decryption mechanism, the sensitive data being used to protect the information item, and the at least one receiving terminal capable of interacting with a SIM module storing a second encryption/decryption mechanism identical to the first encryption/decryption mechanism, for decrypting the sensitive data.

24 Claims, 5 Drawing Sheets

OTHER PUBLICATIONS

Figure 1:
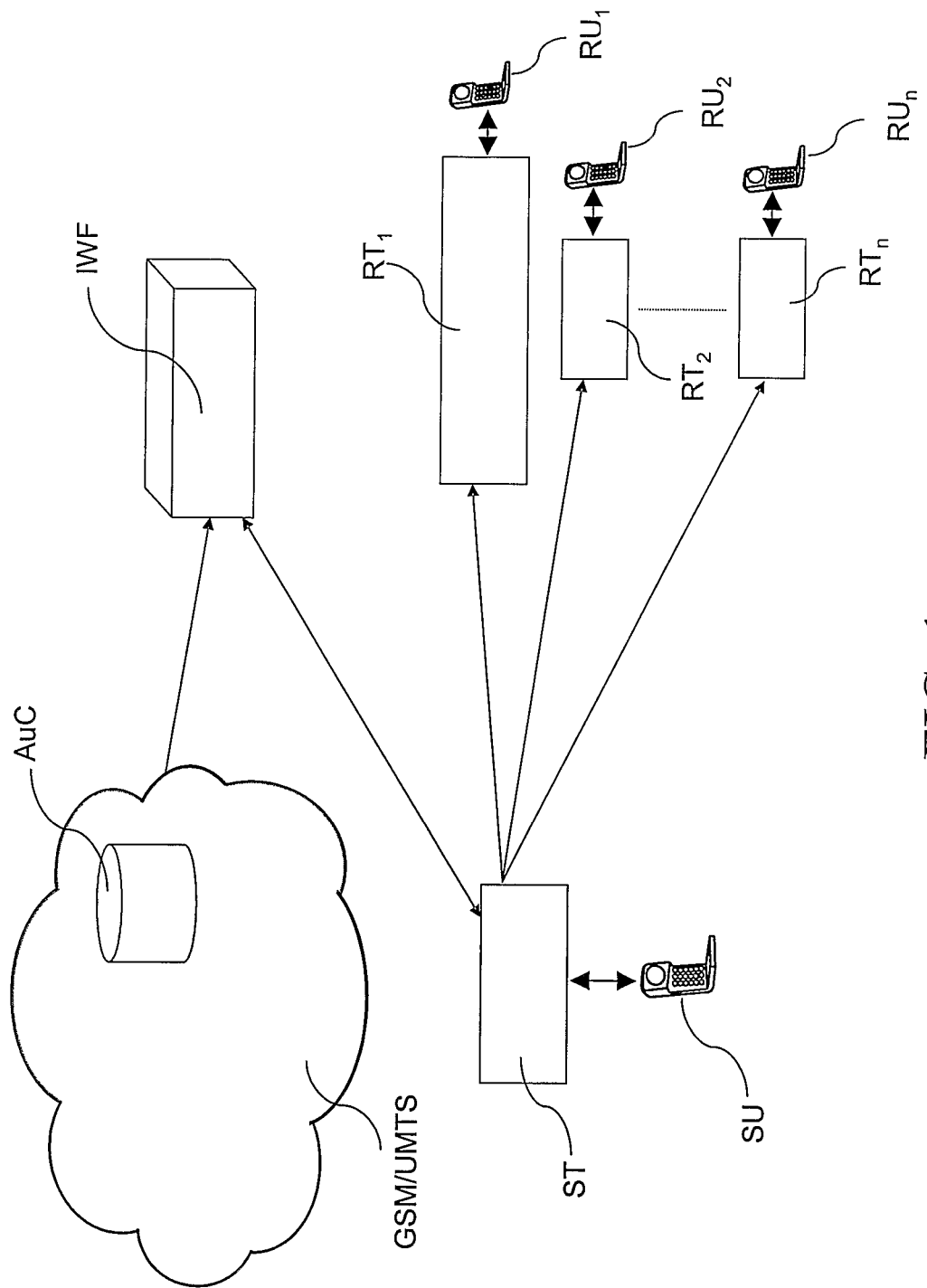

Sommerfeld, B. et al., "Secure Shell (secsh)," http://www.ietf.org/html.charters/secsh-charter.html, pp. 1-3, (Sep. 8, 2005).

Schneier, B. et al., "Twofish: A128-Bit Block Cipher," http://www.counterpane.com/twofish.html, pp. 1-68, (Jun. 15, 1998).

Rivest, R. L. et al., "The RC6™ Block Cipher," Algorithm Specification, Version 1.1, pp. 1-21, (Aug. 20, 1998).

Anderson, R. et al., "Serpent: A Proposal for the Advanced Encryption Standard," AES Submission, pp. 1-23, (1998).

ETSI TS 100 977 v8.3.0 (Aug. 2000), Technical Specification, "Digital cellular telecommunication system (Phase 2+); Specification of the Subscriber Identity Module—Mobile Equipment (SIM ME) interface", GSM 11.11 version 8.3.0, pp. 1-170, (1999).

ETSI TS 100 929 V8.1.0 (Jul. 2001), Technical Specification, "Digital cellular telecommunications system (Phase 2+); Security Related Network Functions", GSM 03.20 version 8.1.0, pp. 1-97, (1999).

Menezes, A. J. et al., "Overview of Cryptography", Handbook of Applied Cryptography, CRC Press, 1 cover sheet and pp. 1-48 (1996).

\* cited by examiner

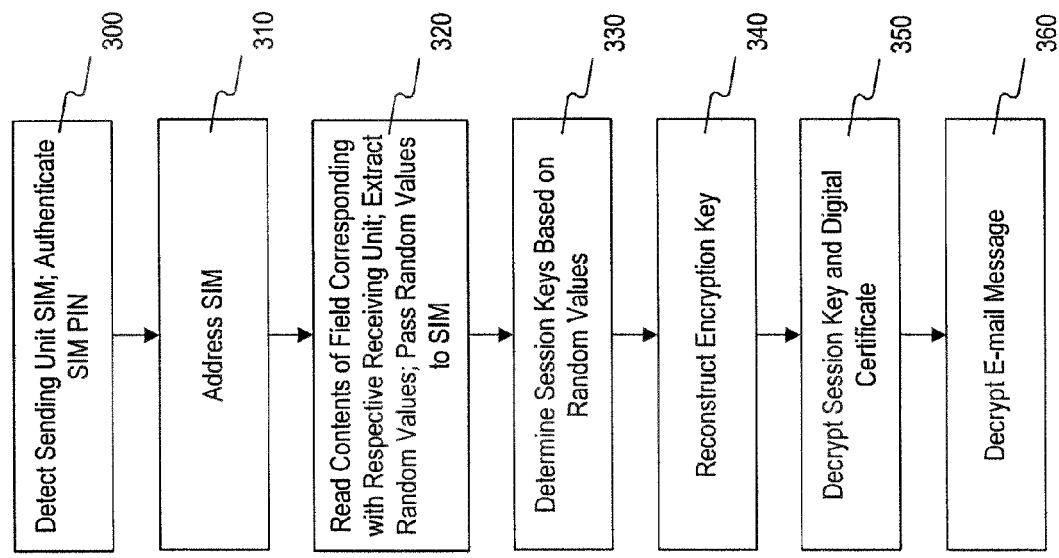

METHOD AND SYSTEM FOR PROTECTING INFORMATION EXCHANGED DURING COMMUNICATION BETWEEN USERS

CROSS REFERENCE TO RELATED APPLICATION

This application is a national phase application based on PCT/EP2004/006936, filed Jun. 25, 2004, the content of which is incorporated herein by reference.

FIELD OF THE INVENTION

The present invention relates in general to techniques for implementing security in communication systems. More particularly, the present invention relates to a method and system for protecting information exchanged during the communication between users.

DESCRIPTION OF THE RELATED ART

Cryptography is considered today as one of the basic tools for enabling security in communication systems. Usually, for protecting communication between users, cryptographic algorithms of symmetric type are used.

Further, communication protocols (for instance SSL/TLS, Ipsec, SSH) exist that use both cryptographic algorithms of symmetric type and cryptographic algorithms of asymmetric type, for protecting the communication between users. In particular, asymmetric encryption algorithms are used to protect a secret or key subsequently used for encrypting the communication via a symmetric algorithm.

In US 2002/0007453 a secure mail transmission system is described that provides virus protection, document tracking, tamper proofing, authentication through digital signatures in addition to secure encryption means and time date verification for e-mail messages. The system encrypts a sent message at a user station and provides digital authentication and confidential encryption schemes prior to delivery of the secure mail message to the secure mail system over a communication network. The secure mail system unpacks the secure transmission, verifies the contents, provides a time date stamp and virus checking before encrypting again an retransmitting the original message. The transmission can be logged and stored for later verification.

Additionally, WO 02/093967 discloses a method of authenticating a client to a communication system in which a client may be authenticated by transmitting or beaming a telecommunication network subscriber's authentication to the client from a device, over a wireless link. For example, a GSM telephone may authenticate an electronic book to a content providing service within the Internet. The service verifies the authentication using the subscriber's GSM network operator's Authentication Center to generate an authenticator and the client correspondingly generates a local copy of the authenticator using a GSM SIM over the wireless local link. The authentication is then determined by checking that these authenticators match and thereafter the authenticator can be used as a session key to encrypt data in the service. The service may be any personal or otherwise limited access service. Such services include, voice communications (e.g. voice over IP) e-mail messages, instant messaging, e-commerce.

OBJECT AND SUMMARY OF THE INVENTION

The object of the invention is thus to provide an arrangement implementing a secure and low-cost method for distributing sensitive data used to protect any information exchanged during the communication between users and, in any case, between users using terminals such as note books, portable computers, personal computers, hand held computers, PDAs, smartphones, and so on, connected to a network. The exchanged information can comprise data including, for example, e-mail messages, SMS—Short Message Service, MMS—Multimedia Messaging Service, IM—Instant Messaging, etc.

More specifically, the object of the invention is to provide a method for encrypting/decrypting in a secure way sensitive data used to protect any information exchanged between users without using high cost mechanisms for computing the key used in said encryption/decryption procedure. In particular, the present inventions makes use of a secure network (e.g., the GSM/UMTS network) and a secure component of such network (e.g., the SIM module) to generate said key used in said encryption/decryption procedure.

According to an aspect of the present invention, such an object is achieved by means of a method for enabling at least one receiving user to access a protected information item sent by a sending user through a communication network, the possibility of accessing said protected information item depending on the availability to said at least one receiving user of sensitive data, sent by said sending user in encrypted form, said encrypted form deriving from a first encryption/decryption mechanism, the method comprising the steps of:

providing said at least one receiving user with a SIM module storing a second encryption/decryption mechanism functionally identical to said first encryption/decryption mechanism; and decrypting said sensitive data at said at least one receiving user exploiting said second encryption/decryption mechanism.

According to another aspect of the present invention such an object is achieved by means of a method for transmitting a protected information item from a sending user (SU) to at least one receiving user ($RU_1$, $RU_2$, . . . , $RU_n$) through a communication network, the possibility of accessing said protected information item depending on the availability to said at least one receiving user ($RU_1$, $RU_2$, . . . , $RU_n$) of sensitive data ($K_{sess}$, $C_{ert}$), sent by said sending user (SU) in encrypted form, said encrypted form being apt to be decrypted by said at least receiving user ($RU_1$, $RU_2$, . . . , $RU_n$) by a SIM encryption/decryption mechanism stored in a SIM module associated to said at least one receiving user ($RU_1$, $RU_2$, . . . , $RU_n$), the method comprising the steps of:

encrypting said sensitive data ($K_{sess}$, $C_{ert}$) in said encrypted form by an encryption/decryption mechanism functionally identical to said SIM encryption/decryption mechanism.

According to a further aspect of the present invention such an object is achieved by means of a system comprising a sending terminal and at least one receiving terminal, said terminals being apt to be connected to a communication network for transmitting an information item from said sending terminal to said at least one receiving terminal, said sending terminal being linked via a secure channel to a unit adapted to encrypt sensitive data using a first encryption/decryption mechanism, said sensitive data being used to protect said information item, and said at least one receiving terminal being apt to interact with a SIM module storing a second encryption/decryption mechanism, functionally identical to said first encryption/decryption mechanism, for decrypting said sensitive data.

According to further aspects of the present invention such an object is achieved by means of a related communication network and a computer program product loadable in the memory of at least one computer and comprising software code portions for performing the steps of the method of the invention when the product is run on a computer. As used herein, reference to such a computer program product is intended to be equivalent to reference to a computer readable medium containing instructions for controlling a computer system to coordinate the performance of the method of the invention. Reference to "at least one computer" is evidently intended to highlight the possibility for the system of the invention to be implemented in a distributed/modular fashion.

Further preferred aspects of the present invention are described in the following description.

In the remainder of the present description and claims we shall define as SIM module a SIM card typically involved in a GSM network or a USIM card typically involved in a UMTS network, or a similar card used in a different wireless network and provided with encryption based authentication or identification features, e.g., based on a challenge and response mechanism.

Specifically, in the arrangement described herein, a server, able to interface the GSM/UMTS network provides, via a secure channel, a previously authenticated sending user with sensitive data (that in the arrangement described hereafter are in the form of cryptographic parameters comprising a session key and a related digital certificate) encrypted with an encryption key that can be generated via the SIM of each receiving users.

The sensitive data are used to effectively protect any information exchanged between the parties. As a consequence, only the receiving users, making use of their own SIM, will be able to obtain the encryption key and thus to decrypt the encrypted sensitive data and to access to the protected information. In a preferred embodiment of the invention the sending user authentication is performed making use of his/her own SIM. This requires the validity of the SIM associated with the sending user and that of the receiving users.

BRIEF DESCRIPTION OF THE ANNEXED DRAWINGS

Figure 2:
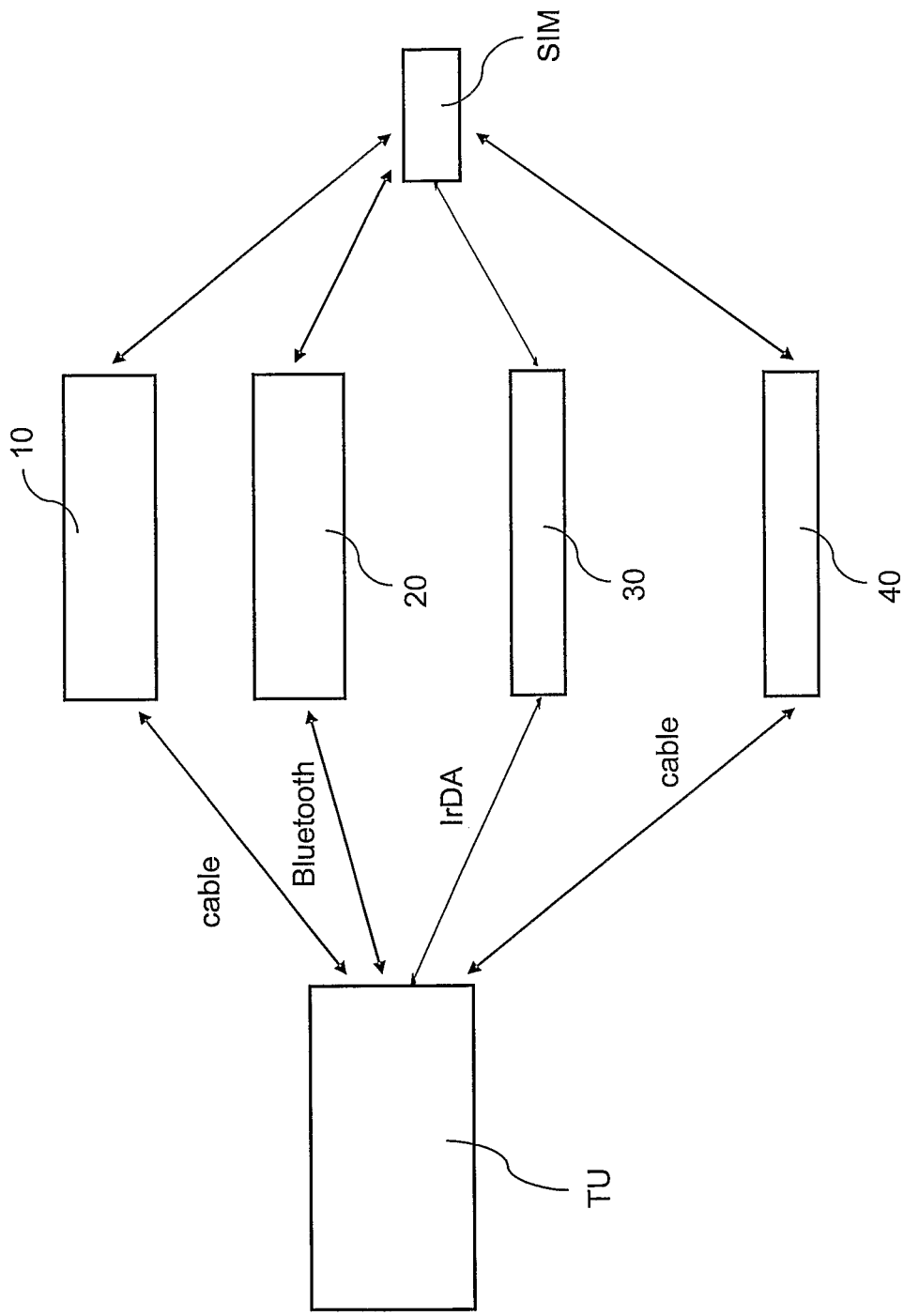
Figure 3:
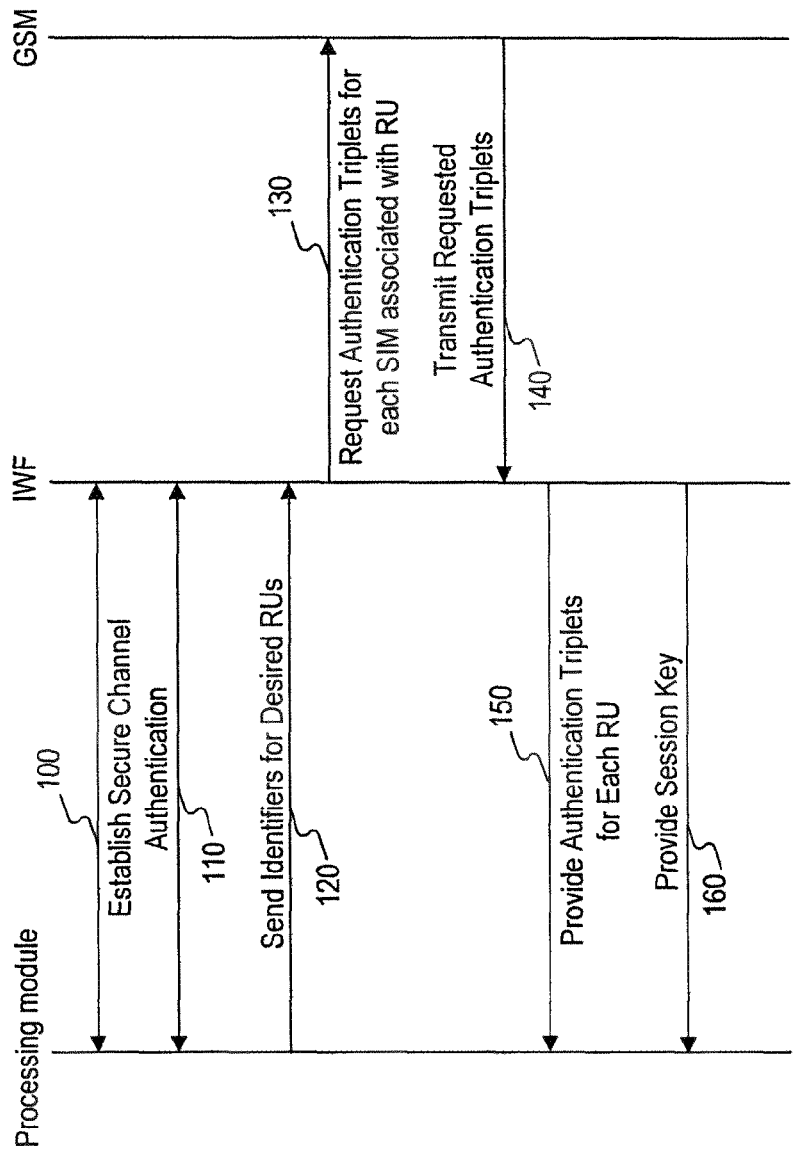
Figure 4:
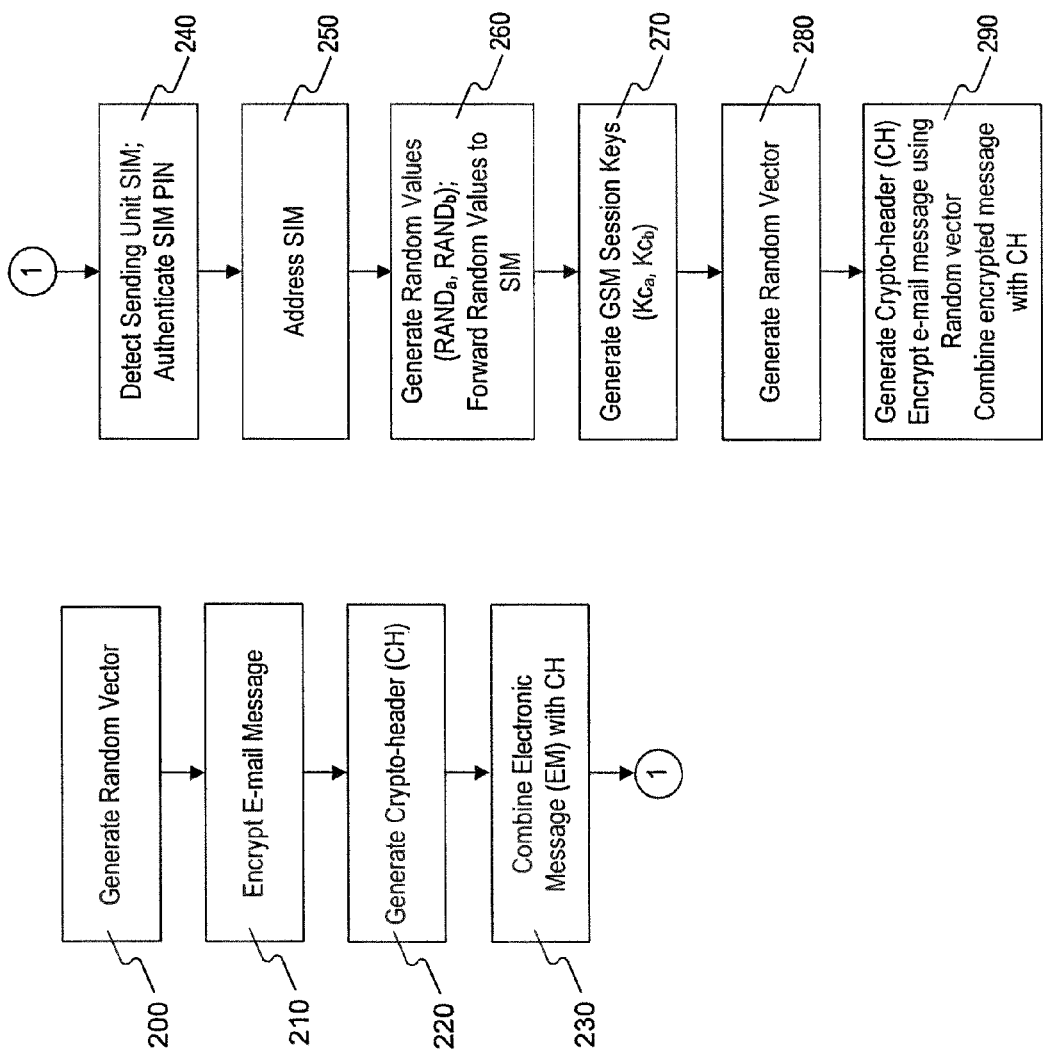

The invention will now be described, by way of example only, by referring to the enclosed figures of drawing, wherein:

FIGS. 1 and 2 are blocks diagram exemplary of the architecture of a system as described herein;

FIGS. 3, 4, and 5 are charts exemplary of possible operation of a system according to the arrangement described herein; and FIG. 6 is a functional block diagram representative of information handling in the arrangement described herein.

DETAILED DESCRIPTION OF PREFERRED EMBODIMENTS OF THE INVENTION

The present description refers, by way of example only, to a possible embodiment of the arrangement described herein based on a GSM network and a related SIM infrastructure. Those of skill in the art will promptly appreciate that the arrangement described herein may be adapted for operation within the framework of e. g. a UMTS network by exploiting the related USIM infrastructure. The same can apply to any other network framework supported by an encryption based subscriber identity infrastructure based on the challenge-response scheme and on cards or tokens provided with encryption based authentication or identification features, or otherwise essentially similar to the SIM infrastructure. In general, such network frameworks are based on an encryption/decryption mechanism that is stored and/or running on a module, such as a card or token, associated to network users, and on a functionally identical encryption/decryption mechanism stored and/or running in the network infrastructure, the module associated to the user and the network infrastructed possibly including one or more shared secret, such as an encryption key.

As used herein, the term "SIM" is therefore intended to encompass all these alternative infrastructures based on the same operating principles. Specifically, a SIM card or a USIM card, is typically used in mobile networks, such as GSM or UMTS networks respectively, to control and protect the user access to the network resources. In order to gain access to a mobile network, a user must be authenticated. In a GSM/UMTS network this authentication is implemented as a classical challenge-response mechanism. The network sends a random value, called RAND, to the user mobile phone, which, in turn, forwards the value to the SIM. The SIM, which contains a unique secret key, called Ki, encrypts this RAND with a mobile operator dependent algorithm called A3, in order to produce an authentication response SRES. This authentication response SRES is returned to the network which, knowing the SIM key Ki, performs the same computation and checks its SRES against the one supplied by the user. If the two values match, the access is granted to the user, otherwise the access request is rejected. In the former case, the SIM and the network will also encrypt the RAND value with another mobile operator dependent algorithm, called A8, and with the key Ki, to produce a session key, called Kc. This key will be passed by the SIM to the mobile phone, in order to protect the radio link between the mobile phone and the mobile network transceiver station.

Furthermore, the present description refers, by way of example only, to a possible embodiment in which information exchanged between users comprise e-mail messages sent by a sending user to one or more receiving users. Those of skill in the art will promptly appreciate that the arrangement described herein may be extended to any exchanged information comprising data such as for example SMS—Short Message Service, MMS—Multimedia Messaging Service, IM—Instant Messaging, etc.

As shown in FIG. 1, the arrangement described herein comprises the following elements:

Sending User (SU): as indicated in the foregoing, this is the user that needs to send a protected e-mail message. He/she is assigned a SIM by a network operator and he/she may send such protected e-mail message via his/her terminal ("sending terminal ST"), such as for example a notebook, a portable computer, a personal computer, a hand held computer, a PDAs, a smart phone and the like.

Receiving Users ($RU_1, RU_2, \ldots, RU_n$): as indicated in the foregoing, these are the users receiving the protected e-mail message. Each receiving user ($RU_1, RU_2, \ldots, RU_n$) is the owner of a SIM and he/she can receive such protected e-mail message through a respective receiving terminal $RT_1$, $RT_2, \ldots, RT_n$ such as for example a notebook, a portable computer, a personal computer, a hand held computer, a PDAs, a smart phone and the like.

As shown in FIG. 2, the sending terminal ST and the receiving terminals $RT_1, RT_2, \ldots, RT_n$ (all these terminals are represented in FIG. 2 with a single block designated TU) can be connected to the respective SIMs via various technologies, such as, by non limiting example:

a standard PCSC reader 10;

a mobile phone through a Bluetooth channel 20 (used as a wireless SIM reader);

a mobile phone through an IrDA channel 30; or a mobile phone 40 through a cable connected to Serial/Parallel/USB/Firewire port (used as a wired SIM reader).

Technological evolution will expectedly provide new devices and protocols to interface a SIM to a computer system. The present invention does encompass the possible use of such new devices and protocols.

Inter-Working Function (IWF): as used herein, this is a server typically under the control of the network operator (e.g. a mobile network operator) providing the sending user SU, previously authenticated and via a secure channel, with sensitive data used to protect the e-mail messages to be sent. Further, the Inter-Working Function IWF provides the sending user SU with activation data used to activate the encryption mechanism stored on the SIMs of the receiving users $RU_1, RU_2, \ldots, RU_n$.

In particular, such a server is in a position to interface with the respective network (for example a GSM or a UMTS network) and specifically with a so-called AuC (Authentication Centre), to request to said Authentication Centre AuC, in connection with each SIM identifier associated to a respective receiving user, authentication triplets <RAND, SRES and Kc>. Such authentication triplets <RAND, SRES and Kc> are used by the Inter-Working Function IWF either to compute an encryption key used to encrypt said sensitive data or to obtain said activation data.

The sending terminal ST and the Inter-Working Function IWF are connected via network technologies and protocols. Standard solutions or proprietary solutions can be used for that purpose. The description that follows will refer, by way of example only, to standard technologies and protocols as defined by IETF (Internet Engineering Task Force), the main international entity for the standardization of protocols used over IP networks.

The sending user SU and the receiving users $RU_1$, $RU_2, \ldots, RU_n$ are connected via standard electronic mail systems/apparatuses. This means that the present invention does not require any modification of the electronic mail systems used at the present time.

Alternatively, the sending and receiving user can be connected by any other means including a network (wired, wireless or other) different from the network associated with the SIM of the sending and/or receiving user.

The steps performed by the users' terminals involved in the arrangement described herein can be implemented by means of processing modules installed on said users' terminals. These processing modules do not need to be necessarily pre-installed on the terminals. They can easily be downloaded on-line from a web site to which users SU, $RU_1, RU_2, \ldots,$ $RU_n$ can connect. Various technologies such as Java and ActiveX can be used for that purpose. These technologies allow to include executable object code directly within a web page by means of TAGs. A browser adapted to support such technologies such as Internet Explorer, Netscape Navigator or Opera, is in a position, after detecting the presence of Java or ActiveX applet, to download locally the corresponding code and provide for execution thereof. Both technologies permit to define security policies when downloading the executable code. Specifically, the possibility exists of configuring the browser in such a way that only Java and ActiveX applets bearing a digital signature are downloaded. This is primarily in order to reduce the risk of downloading so-called "maleware", namely software written with the only purpose of revealing the users' data or accessing in an unauthorised way to the users' terminals ST, $RT_1, RT_2, \ldots, RT_n$. Other solutions may be adopted for the same purpose, such as downloading an executable code via network protocols such as FTP, TFTP, HTTP. Alternatively, the code required may be pre-installed via other means such as a CD, floppy disk, USB token and the like. Of course, on-line downloading may be preferable in terms of ensuring a wider device coverage.

Furthermore, each processing module can be replaced by using suitable plug-in, integrated in e-mail software client of the users (for instance, add-in for Outlook, plug-in for Netscape Messenger, etc).

In the following, three basic procedures will be considered, namely:

request and provision of cryptographic keys;
encryption and sending of an e-mail message;
decryption of the encrypted e-mail message.

Request and Provision of Cryptographic Keys

The procedure of request and provision of cryptographic keys is started by the sending user SU when he/she wishes to send a protected e-mail message to one or more receiving users $RU_1, RU_2, \ldots, RU_n$.

Specifically, this procedure involves the Inter-Working Function IFW to generate (for example in a random way) a session key used to encrypt the e-mail message. Such session key is then encrypted together with a related digital certificate with an encryption key based on cryptographic keys associated to the SIM of each receiving user $RU_1, RU_2, \ldots, RU_n$. As a consequence, only the effective receiving users $RU_1$, $RU_2, \ldots, RU_n$, making use of their own SIM, will be able to recalculate this encryption key thereby obtaining the session key and its related digital certificate. At this point, the digital certificate is used to verify the integrity of the session key while the session key is used to decrypt the encrypted e-mail message.

As shown in FIG. 3, the procedure of request and provision of cryptographic keys involves the following steps, performed by the processing module installed on the sending terminal ST:

establishing a secure communication channel between the sending terminal ST and the Inter-Working Function IWF (step 100). To this end, various different technical solutions may be used such as, but not limited to:

Secure Socket Layer/Transport Layer Security (SSL/TLS), see e.g. Netscape Corporation, "SSLv3 Protocol Specification" http://www.netscape.com/eng/ssl3/) and Internet Engineering Task Force (IETF) RFC2246, "TLS Version 1.0", January 1999, (the text can be downloaded, on the filing date of the present specification, from the Internet site http://www.ietf.org/rfc/rfc2246.txt?number=2246);

Ipsec, see e.g. Internet Engineering Task Force (IETF), "IP Security Protocol (ipsec)" (the text can be downloaded, on the filing date of the present specification, from the Internet site http://www.ietf.org/html.charters/ipsec-charter.html);

Secure Shell (SSH) forwarding, see e.g. Internet Engineering Task Force (IETF), "Secure Shell (secsh)" (the text can be downloaded, on the filing date of the present specification, from the Internet site http://www.ietf.org/html.charters/secsh-charter.html).

carrying out the authentication of the Inter-Working Function IWF towards the sending terminal ST (in a step 110). To this end, a digital certificate X.509 has been used. Nonetheless, other technical solutions can be used such as, but not limited to:

Pre-Shared Key;
One-Time Password;

carrying out the authentication of the sending terminal ST towards the Inter-Working Function IWF (always in the step 110). In a preferred embodiment of the arrangement described herein, this authentication can be performed via the SIM of the sending user SU, thereby resorting to the GSM authentication mechanism. However, any other authentication method can be used such as e.g.

Digital certificate;
Pre-Shared Key;
One-time Password;
Username-Password sending to the Inter-Working Function IWF a list of identifiers, each associated to a receiving user $RU_1, RU_2, \ldots, RU_n$ for which cryptographic keys are required (step 120). A non-limiting list of receiving users' identifiers, designated with $ID_{RU1}, ID_{RU2}, \ldots, ID_{RUn}$ and adapted for use in the arrangement described herein, can include:

MSISDN (Mobile Subscriber ISDN Number);
e-mail address;
IMSI (International Mobile Station Identity—now International Mobile Subscriber Identity).

At this point, for each receiving users' identifier $ID_{RU1}, ID_{RU2}, \ldots, ID_{RUn}$, the Inter-Working Function IWF performs the following operations:

carrying out the association between each receiving user's identifier $ID_{RU1}, ID_{RU2}, \ldots, ID_{RUn}$, and the identifier of the SIM associated to the respective receiving user $RU_1, RU_2, \ldots, RU_n$. This operation is not necessary if the receiving user's identifier corresponds to the SIM identifier. Various elements may be resorted to, in order to act as the SIM identifier. Exemplary of these are the IMSI, the MSISDN (Mobile Subscriber ISDN Number), the SIM serial number and so on. In the following it will be assumed that the IMSI identifier is used;

establishing a connection with the GSM network for requiring to the Authentication Centre AuC at least two GSM authentication triplets <$RAND_1$, $SRES_1$, $Kc_1$> and <$RAND_2$, $SRES_2$, $Kc_2$>, for each SIM associated to a receiving user's identifier $ID_{RU1}, ID_{RU2}, \ldots, ID_{RUn}$ (step 130);

receiving these at least two GSM authentication triplets <$RAND_1$, $SRES_1$, $Kc_1$> and <$RAND_2$, $SRES_2$, $Kc_2$> from the Authentication Centre AuC (step 140);

generating a response message (step 150) to the sending terminal ST that, for the j-th receiving user $RU_j$, can be represented as (see FIG. 6):

$R_j = RAND_{1,j} \| RAND_{2,j} \| E_{Kj}(K_{sess}, C_{ert}) \| ID_{RUj}$ where:

$RAND_{1,j}, RAND_{2,j}$ are two random values, for example two 128 bit random values, each representing a GSM authentication challenge provided by the Authentication Centre AuC when a GSM authentication triplet is required;

$K_j$ is an encryption key, for example including 128 bits, computed by the Inter-Working Function IWF. Specifically, the Inter-Working Function IWF computes the encryption key Kj by applying a hash function h to the concatenation of the two GSM session keys $Kc_{1,j}$ and $Kc_{2,j}$ associated to the secret key Ki of the SIM of rhe j-th receiving user $RU_j$. In brief: $K_j = hash(Kc_{1,j} \| Kc_{2,j})$ General information concerning the applying of a hash function can be located in A. J. Menezes, P. C. van Oorschot. S. A. Vanstone, "Handbook of Applied Cryptograpy", CRC Press, ISBN: 0-8493-8523-7, October 1996.

Different functions may be used for that purpose such as (by referring to a non-limiting list) a SHA-1 function or a MD5 function.

More generally, the encryption key $K_j$ can be computed using n GSM authentication triplets. In this case, therefore, $K_j = f(Kc_{1,j}, Kc_{2,j}, \ldots, Kc_{n,j}, SRES_{1,j}, SRES_{2,j}, \ldots, SRES_{n,j})$;

$K_{sess}$: this term represents the session key used to encrypt the e-mail message to be sent to the j-th receiving user $RU_j$.

Such a session key is generated randomly by the Inter-working Function IWF in a step 160;

$C_{ert}$: this term represents a sort of symmetric digital certificate of the session key $K_{sess}$ (analogous to the asymmetric digital certificates of the type X.509 or OpenPGP). This digital certificate $C_{ert}$ can codify any information associated to the utilization of the session key $K_{sess}$. To this aim, a non-limiting list can includes the following information:

temporal validity of the session key $K_{sess}$ (for instance, from an initial time $t_1$ to a final time $t_2$).

service accessible via the session $K_{sess}$ (for instance, in the arrangement described herein, the e-mail service);

entity requiring the session key $K_{sess}$. In the arrangement described herein, such an entity corresponds to the sending user's identifier $ID_{SU}$;

$ID_{RUj}$: this term represents the j-th receiving user's identifier;

$E_{Kj}$: this term represents a symmetric algorithm E of a known type using the encryption key $K_j$ for encrypting the session key $K_{sess}$ together with its digital certificate $C_{ert}$. In the specific case, the AES encryption algorithm was used in CBC (Cipher Block Chaining) mode with $K_j$ key and initialisation vector IV at 128 bit. It is nonetheless possible to use any other encryption algorithm. A non limiting list of these algorithm may include, for example:

Twofish, B. Schneier, J. Kelsey, D. Whiting, D. Wagner, C. Hall, N. Ferguson, "Twofish: A 128-Bit Block Cipher", AES submission, June 1998;

RC6, R. Rivest, M. Robshaw, R. Sidney, Y. L. Yin, "The RC6 Block Cipher, algorithm specification", August 1998; and Serpent, Anderson, E. Biham, L. Knudsen, "Serpent", AES submission, 1998.

Always in the step 160, the Inter-Working Function IWF also sends the response message $R_1, \ldots, R_n$ associated to each receiving user $RU_1, RU_2, \ldots, RU_n$ and the session $K_{sess}$ to the sending terminal ST. This session key $K_{sess}$ will be used by the processing module to encrypt the e-mail message to be sent to each receiving user $RU_1, RU_2, \ldots, RU_n$.

E-Mail Message Encryption Procedure

At this point, the processing module, after receiving the response message $R_1, \ldots, R_n$, and the session key $K_{sess}$ by the Inter-Working Function IWF, can start the e-mail message encryption procedure.

With reference to FIG. 4, in a step 200, the processing module generates a random vector, defined Initialisation Vector IV, including, for example, 128 bits. Such a random vector is exploited in cipher processing (encrypting/decrypting) when a cipher mode requesting an Initialisation Vector is used such as CBC (Cipher Block Chain), CFB (Cipher FeedBack), OFB (Output FeedBack). The Initialisation Vector IV can also be omitted depending on the mode of operation of the encrypting entity; for instance, the Initialisation Vector IV is not required in the case of ECB (Electronic Code Book). Details on the various cipher processing methods referred to in the foregoing are provided e.g. in the Menezes et al. reference already mentioned in the foregoing.

In a step 210, the processing module encrypts the e-mail message and all its attachments, via the session key $K_{sess}$ and the random vector IV, for instance by using the AES cipher in the CBC mode. However, any other symmetric encryption methods can be used such as e.g. RC6, Twofish, Serpent, 3DES, this being a non-limiting list. The generated encrypted e-mail message is indicated with the reference EM in FIG. 6.

Then, in a step 220, the processing module generates a crypto header CH to permit decryption.

As shown in FIG. 6, such a crypto header CH includes the following fields:

N: this term represents the number of receiving users $RU_1$, $RU_2$, ..., $RU_n$ to which the encrypted e-mail message EM will be sent;

$R_1$, ..., $R_n$: this term represents the concatenation of the responses provided by the Inter-Working Function IWF for each receiving user $RU_1$, $RU_2$, ..., $RU_n$;

IV, i.e. the random vector possibly used for the encryption (CBC or other encryption mode requiring such a parameter) and generated by the processing module; and $MAC_{Ksess}$ (N, $R_1$, ..., $R_n$, IV, EM) this is a cryptographic control checksum on the encrypted e-mail message and the three previous fields (N, $R_1$, ..., $R_n$, IV), Such cryptographic control checksum may be generated by means of a MAC (Message Authentication Code) function. Exemplary of such MAC functions are e.g. HMAC-SHA-1, HMAC-MD5, AES-XCBC-MAC, etc. In the following the assumption will be made that the function HMAC-SHA-1 is used. In any case, such cryptographic control checksum detects any possible unauthorized modifications of the encrypted e-mail message.

Reverting to the flow chart of FIG. 4, in a step 230, the processing module codifies the encrypted e-mail message EM and the crypto header CH ("codified mail" in the following) in textual form using readable characters. A non-limiting list of coding procedures adapted for use in the arrangement described herein includes:

Base64; and

Hexadecimal.

Subsequently, the processing module sends the codified mail to each receiving user $RU_1$, $RU_2$, ..., $RU_n$ via a standard e-mail transmission system.

In addition, the processing module can also encrypt the e-mail message in such a way to enable the sending user SU to decrypt a local copy of it. In a preferred embodiment of the invention this local copy can be encrypted via the SIM of the sending user SU. However other encryption mechanism can be used such as for e.g. the PGP™.

Specifically, with reference to FIG. 4, in a step 240, the sending user SU interfaces his or her sending terminal ST with his/her SIM. To this end, various different solutions may be used, as shown in FIG. 2.

The processing module checks if a SIM is connected to the sending terminal ST by means of one of the channels 10 to 40 shown in FIG. 2.

Once a SIM is detected, the processing module checks the possible presence of a PIN protecting an access. In that case, the sending user SU is requested to enter a corresponding PIN, which occurs via e.g. a graphic user interface (GUI).

Subsequently, in a step 250, the processing module accesses the SIM (possibly via the PIN provided by the sending user SU) and in a step 260 produces two random values $RAND_a$ and $RAND_b$, in particular two 128 bit random values. These random values $RAND_a$ and $RAND_b$ are forwarded to the SIM.

In a step 270, the SIM computes two GSM session keys $Kc_a$ and $Kc_b$, each including 64 bits, based on the secret key Ki of the SIM and the A8 GSM security algorithm. The A8 GSM security algorithm represent the basic security algorithm stored in the SIM. Specific details in that respect can be derived from the GSM Technical Specification GSM 03.20 (ETSI TS 100 929 v8.1.0): "Digital cellular telecommunication system (Phase 2+); Security Related network functions", European Telecommunications Standards Institute, July 2001; or from the GSM Technical Specification GSM 11.11 (ETSI TS 100 977 v8.3.0): Digital cellular telecommunication system (Phase 2+); Specification of the Subscriber Identity Module—Module Equipment (SIM-ME) interface", European Telecommunication Standards Institute, August 2000. In brief: $Kc_a$=A8 ($RAND_a$), $Kc_b$=A8 ($RAND_b$)

Such computation is based on the two random values $RAND_a$ and $RAND_b$ provided by the processing module. These two GSM session keys $Kc_a$ and $Kc_b$ are sent back to the processing module that computes an encryption key $K_{SU}$, including 128 bits, by applying a hash function h to the concatenation of the two session keys $Kc_a$ and $Kc_b$. In brief; $K_{SU}$=h($Kc_a$||$Kc_b$). General information concerning the applying of a hash function can be located in A. J. Menezes, P. C. van Oorschot. S. A. Vanstone, "Handbook of Applied Cryptograpy", CRC Press, ISBN: 0-8493-8523-7, October 1996, reference already mentioned in the foregoing.

Different functions may be used for that purpose such as (by referring to a non-limiting list) a SHA-1 function or a MD5 function.

Also in this case, it is also possible to compute the encryption key $K_{SU}$ using different manners, possibly using also the authentication responses SRES obtained via the authentication challenges (random values) RAND. In general, the encryption key $K_{SU}$ can be computed as a function of the two session keys $Kc_a$ and $Kc_b$ and the authentication responses $SRES_a$, $SRES_b$ obtained via the authentication challenges $RAND_a$ and $RAND_b$: $K_{SU}$=f ($Kc_a$, $Kc_b$, $SRES_a$, $SRES_b$). In this way, it is possible to change the encryption key length by operating on the number of inputs processed. For instance, it is possible to increase the number of inputs to be processed by sending a sequence of authentication challenges $RAND_a$, $RAND_b$, ..., $RAND_n$ and processing the corresponding outputs of the SIM $Kc_a$, $Kc_b$, ..., $Kc_n$, $SRES_a$, $SRES_b$, ..., $SRES_n$. In that case, therefore, $K_{SU}$=f ($Kc_a$, $Kc_b$, ..., $Kc_n$, $SRES_a$, $SRES_b$, ..., $SRES_n$).

Subsequently, the processing module can also generate, in a step 280, a random vector IV, possibly used for the encryption (CBC or other encryption mode requiring such a parameter).

In a step 290, the processing module also generates a crypto header $CH_1$, similar to the crypto header CH generated in the step 220, and including the following fields:

N: in this case, this term is equal to 1 because the e-mail message is encrypted only for the sending user SU;

$R_{SU}$=$RAND_{a,SU}$||$RAND_{b,SU}$||$E_{KSU}$($K_{sess}$, $C_{ert}$)||$ID_{SU}$ where:

$RAND_{a,SU}$, $RAND_{b,SU}$ are the two random values;

$K_{sess}$ is the session key generated by the Inter-Working Function IWF and used to encrypt the e-mail message;

$C_{ert}$: is a sort of symmetric digital certificate of the session key $K_{sess}$;

$ID_{SU}$: is the sending user's identifier;

$E_{KSU}$: this term represents a symmetric algorithm E using the encryption key $K_{SU}$ for encrypting the session key $K_{sess}$ together with its digital certificate $C_{ert}$. Also in this case, the AES encryption algorithm was used in CBC (Cipher Block Chaining) mode with $K_{SU}$ key and initialisation vector IV at 128 bit. It is nonetheless possible to use any other encryption algorithm such as for example Twofish, RC6, Serpent.

IV: is the random vector;

Subsequently, the processing module encrypts the e-mail message via the session key $K_{sess}$ and the random vector IV, for instance by using the AES cipher in the CBC mode.

Then, the processing module codifies the encrypted e-mail message and the crypto header $CH_1$ ("codified mail") in textual form using readable characters.

At this point, the codified mail is stored in the sending terminal ST for local use.

It can be noted that, a different encryption mechanisms can be used for encrypting locally the e-mail message. For instance, the processing module can locally generate a response $R_{n+1}$, associated to the sending user SU, without requesting it to the Inter-Working Function IWF.

E-Mail Message Decryption Procedure

At this point, each receiving user $RU_1, RU_2, \ldots, RU_n$, after receiving the codified mail by the sending user SU, is able to decrypt the included encrypted e-mail message EM without the need to connect his/her receiving terminal RT to any external entity (such as for example the Inter-Working Function IWF or other servers). Specifically, each receiving user $RU_1, RU_2, \ldots, RU_n$, can decrypt the encrypted e-mail message EM only by using the respective SIM.

It can be noted that the procedure described hereinafter can also be used for decrypting the encrypted e-mail message stored in the sending terminal ST of the sending user SU.

With reference to the flowchart of FIG. 5, the steps 300 and 310 are representative of access steps essentially identical to the steps designated 240 and 250 in FIG. 4.

In a step 320, the processing module, located for example on the j-th receiving terminal $RT_j$ of the j-th receiving user $Ru_j$, reads the contents of the field $R_j$, related to the receiving user's identifier $ID_{RU,j}$ and included in the crypto header CH.

Then, the processing module extracts the two random values $RAND_{1,j}$ and $RAND_{2,j}$ from the field $R_j$ and it passes them on to the SIM.

In a step 330, the SIM performs the calculation of the two GSM session keys $Kc_{1,j}=A8 \ (RAND_{1,j})$ and $Kc_{2,j}=A8 \ (RAND_{2,j})$. These two GSM session keys $Kc_{1,j}$ and $Kc_{2,j}$ are then returned to the processing module.

In a step 340, the processing module re-constructs the encryption key $K_j$ by calculating the hash function h applied to the concatenation of the two GSM session keys $Kc_{1,j}$ and $KC_{2,j}$. In brief: $K_j=hash\ (Kc_{1,j} \| Kc_{2,j})$. It is also possible to use the alternative construction techniques for the encryption key $K_j$ considered in the foregoing, whereby the encryption key $K_j$ can be generally expressed as $K_j=f(Kc_{1,j}, Kc_{2,j}, \ldots, Kc_{n,j}, SRES_{1,j}, SRES_{2,j}, \ldots, SRES_{n,j})$.

In a step 350, the processing module, via the encryption key $K_j$ accesses and decrypts the session key $K_{sess}$ and the related digital certificate $C_{ert}$. In brief: $(K_{sess}, C_{ert})=D_{Kj}\ (E_{Kj}\ (K_{sess}, C_{ert}))$ At this point, the processing module verifies the digital certificate $C_{ert}$ by checking its propriety (for instance the temporal validity of the session key $K_{sess}$) and then it verifies the integrity of the encrypted e-mail message EM by means of the cryptographic control checksum $MAC_{Ksess}$.

In the case of a positive outcome, the processing module reads the field IV (step 360) from the crypto header CH and decrypts the encrypted e-mail message EM via e.g. the AES algorithm in a CBC mode with the random vector IV selected and the session key $K_{sess}$.

The e-mail message is now in plaintext form and can be read from the receiving user $Ru_j$.

Therefore, without prejudice to the underlined principle of the invention, the details and the embodiments may vary, also significantly, with respect to what has been described by way of example, without departing from the scope of the invention as defined in the claims that follow.

For example, as already indicated, the arrangement described herein is adapted for operating also in connection with other type of SIM-type card such as UMTS SIMs, currently referred to as USIMs. USIMs contain security functions that are analogous to the security functions of GSM systems: based on one or more authentication challenges RAND that enable the generation of cryptographic keys to be used as described in the foregoing.

The advantages that may be achieved with the arrangement illustrated are described below.

Specifically, the arrangement described herein substantially exploits two principles: on one hand, the security services offered by SIM cards, e.g. the security mechanisms of cellular technologies, described above and present on the cards; on the other hand, the capability of offering a service to a high number of users without any operating problems in the distribution of access credentials or expensive registrations.

Further, the arrangement described herein makes use of a fully standard SIM, which is a widely deployed and accepted device, to securely generate strong cryptographic keys of variable lengths.

In particular, the SIM does not require any customization or modification to correctly operate within the framework of the arrangement described herein. The SIM does not need to be modified by a SIM Application Toolkit (SAT) or any other similar technology, to work as a smart card or to handle digital certificates.

Moreover, The SIM card, being a hardware device, is a tamper proof security device. Since the key Ki normally cannot be extracted from the SIM card, this is a high security level because the access to the protected information requires physical possession of the card and knowledge of the Personal Identification Number (PIN). Typically, after three attempts at entering the PIN, the card is locked, pre-empting attempted attacks based on theft and carried out before the user realises it and notifies his/her mobile operator.

In this regard, it should be noted that existing security procedures for SIM cards are consolidated and well defined, and have been refined over the years by mobile operators. Therefore, such techniques, originally devised within the GSM context, can also be used to manage authentication credentials on IP public networks. Said procedures, are independent from the network technology employed by the user, for example GSM or IP.

The invention claimed is:

1. A method for enabling at least one receiving user to access a protected information item sent by a sending user through a communication network, the possibility of accessing said protected information item depending on the availability to said at least one receiving user of sensitive data sent by said sending user in encrypted form, said encrypted form derived from a first encryption/decryption mechanism, the method comprising:
    providing each of said at least one receiving user with a SIM module-having stored thereon a second encryption/decryption mechanism, wherein the second encryption/decryption mechanism comprises a SIM identifier that is unique to a respective one of said at least one receiving user and functionally identical to said first encryption/decryption mechanism,
    wherein said sensitive data comprises cryptographic parameters comprising two session keys and a digital certificate, the session keys and digital certificate encrypted together via a random encryption key computed as a function of the two session keys associated with the SIM module; and
    decrypting said sensitive data at said at least one receiving user exploiting said second encryption/decryption mechanism.

2. The method according to claim 1, comprising activating said second encryption/decryption mechanism by means of activation data generated by at least one additional communication network cooperating with said sending user.

3. The method according to claim 2, comprising providing an inter-working function co-operating with said at least one additional communication network for obtaining said activation data.

4. The method according to claim 3, wherein obtaining said activation data comprises requesting authentication data associated with said SIM module to said at least one additional communication network, said authentication data comprising said activation data.

5. The method according to claim 4, comprising calculating said authentication data using said first encryption/decryption mechanism.

6. The method according to claim 4, comprising using said authentication data to generate the encryption key.

7. The method according to claim 3, comprising providing said sending user with a sending terminal, said sending terminal being able to communicate in a secure way with said inter-working function.

8. The method according to claim 7, comprising configuring said inter-working function for receiving a request for said sensitive data by said sending terminal and generating the session key.

9. The method according to claim 7, wherein requesting from said at least one additional network said authentication data comprises:
having said sending terminal and said inter-working function mutually authenticated;
receiving from said sending terminal at least one identifier associated with said at least one receiving user; and
associating said identifier with an identifier of said SIM module.

10. The method according to claim 9, wherein said receiving user's identifier comprises at least one identifier selected from the group of MSISDN, e-mail address, and IMSI.

11. The method according to claim 9, wherein said SIM module identifier comprises at least one SIM module identifier selected from the group of IMSI, MSISDN, and SIM serial number.

12. The method according to 7, comprising configuring said inter-working function for:
generating at least one response message associated with said at least one receiving user, said at least one response message comprising said encrypted sensitive data and said activation data; and
sending said at least one response message and said session keys to said sending terminal.

13. The method according to claim 2, wherein said activation data comprise random values.

14. The method according to claim 12, wherein said sending terminal is configured for:
encrypting said information item via said session keys;
generating a cryptographic header comprising said at least one response message; and
sending said encrypted information and said cryptographic header to said at least one receiving user.

15. The method according to claim 14, comprising providing said at least one receiving user with a respective receiving terminal, said receiving terminal capable of being connected to said SIM module and being configured for:
extracting from said cryptographic header, said activation data and said encrypted sensitive data included in said at least one response message;
sending said activation data to said SIM module for activating said second encryption/decryption mechanism;
calculating said encryption key via said second encryption/decryption mechanism;
decrypting said sensitive data; and
using said sensitive data for accessing said encrypted information item.

16. The method according to claim 14, wherein said cryptographic header comprises a plurality of response messages each comprising at least one identifier associated with a receiving user of the encrypted information item.

17. The method according to claim 1, comprising:
providing said sending user with a respective SIM module storing said second encryption/decryption mechanism; and
decrypting said sensitive data at said at least one sending user exploiting said second encryption/decryption mechanism stored on said respective SIM module.

18. A method for transmitting a protected information item from a sending user to at least one receiving user through a communication network, the possibility of accessing said protected information item depending on the availability to said at least one receiving user of sensitive data sent by said sending user in encrypted form, said encrypted form capable of being decrypted by said at least one receiving user using a SIM encryption/decryption mechanism stored in a SIM module associated with said at least one receiving user, comprising:
receiving, at a processor associated with said sending user, two session keys;
encrypting the session keys with the protected information and a related digital certificate, via a random encryption key computed as a function of the two session keys associated with the SIM encryption/decryption mechanism, to form a codified message, wherein the SIM encryption/decryption mechanism utilizes a SIM identifier that is stored in a SIM module of the at least one receiving user; and
providing the codified message to the at least one receiving user, wherein each of the at least one receiving user is configured to decrypt the codified message using the SIM identifier associated with the receiving user.

19. The method for transmitting a protected information item according to claim 18, comprising activating said SIM encryption/decryption mechanism by means of activation data generated by at least one additional communication network cooperating with said sending user.

20. A system comprising a sending terminal and at least one receiving terminal, said terminals capable of being connected to a communication network for transmitting an information item from said sending terminal to said at least one receiving terminal, said sending terminal being linked via a secure channel to a unit adapted to encrypt sensitive data using a first encryption/decryption mechanism, said sensitive data being used to protect said information item and comprising cryptographic parameters comprising two session keys and a digital certificate, the session keys and digital certificate encrypted together via a random encryption key computed as a function of the two session keys associated with a SIM module, and said at least one receiving terminal capable of interacting with the SIM module having stored thereon a second encryption/decryption mechanism, wherein the second encryption/decryption mechanism comprises a SIM identifier that is unique to the at least one receiving terminal and functionally identical to said first encryption/decryption mechanism, for decrypting said sensitive data.

21. The system, according to claim 20, wherein said unit is capable of cooperating with at least an additional communication network for activating said first encryption/decryption mechanism.

22. A communication network comprising a system having a sending terminal and at least one receiving terminal, said terminals capable of being connected to a communication network for transmitting an information item from said sending terminal to said at least one receiving terminal, said sending terminal being linked via a secure channel to a unit adapted to encrypt sensitive data using a first encryption/decryption mechanism, said sensitive data being used to protect said information item and comprising cryptographic parameters comprising two session keys and a digital certificate, the session keys and digital certificate encrypted together via a random encryption key computed as a function of the two encryption keys associated with a SIM module, and said at least one receiving terminal capable of interacting with the SIM module having stored thereon a second encryption/decryption mechanism, wherein the second encryption/decryption mechanism comprises a SIM identifier that is unique to the at least one receiving terminal and functionally identical to said first encryption/decryption mechanism, for decrypting said sensitive data.

23. A computer-readable medium containing instructions that, when executed by a computer, perform a method for enabling at least one receiving user to access a protected information item sent by a sending user through a communication network, the possibility of accessing said protected information item depending on the availability to said at least one receiving user of sensitive data sent by said sending user in encrypted form, said encrypted form derived from a first encryption/decryption mechanism, the method comprising:

providing each of said at least one receiving user with a SIM module having stored thereon a second encryption/decryption mechanism, wherein the second encryption/decryption mechanism comprises a SIM identifier that is unique to a respective one of said at least one receiving user and functionally identical to said first encryption/decryption mechanism; and decrypting said sensitive data at said at least one receiving user exploiting said second encryption/decryption mechanism, wherein said sensitive data comprises cryptographic parameters comprising two session keys and a digital certificate, the session keys and digital certificate encrypted together via a random encryption key computed as a function of the two session keys associated with the SIM module.

24. A computer-readable medium containing instructions that, when executed by a computer, perform a method for transmitting a protected information item from a sending user to at least one receiving user through a communication network, the possibility of accessing said protected information item depending on the availability to said at least one receiving user of sensitive data sent by said sending user in encrypted form, said encrypted form capable of being decrypted by said at least one receiving user using a SIM encryption/decryption mechanism stored in a SIM module associated with said at least one receiving user, comprising:

receiving, at a processor associated with said sending user, two session keys;

encrypting the session keys with the sensitive data and a related digital certificate, via a random encryption key computed as a function of the two session keys associated with the SIM encryption/decryption mechanism, to form a codified message, wherein the SIM encryption/decryption mechanism utilizes a SIM identifier that is stored in a SIM module of the at least one receiving user; and providing the codified message to the at least one receiving user, wherein each of the at least one receiving user is configured to decrypt the codified message using the SIM identifier associated with the receiving user.

* * * * *